March 15, 1966  P. J. NIESSE  3,239,885
REMOVABLE GUIDE FOR STRAND THREADING
Filed Sept. 12, 1963  2 Sheets-Sheet 1

INVENTOR
P. J. NIESSE
BY
S. Gundersen
ATTORNEY

March 15, 1966  P. J. NIESSE  3,239,885
REMOVABLE GUIDE FOR STRAND THREADING
Filed Sept. 12, 1963  2 Sheets-Sheet 2

United States Patent Office 3,239,885
Patented Mar. 15, 1966

3,239,885
REMOVABLE GUIDE FOR STRAND THREADING
Paul J. Niesse, Baltimore, Md., assignor to Western Electric Company Incorporated, New York, N.Y., a corporation of New York
Filed Sept. 12, 1963, Ser. No. 308,532
1 Claim. (Cl. 18—13)

This invention relates to a removable guide tube utilized in the threading of a strand through strand processing or handling apparatus.

Prior to the extrusion of an insulation material about a wire, the wire is threaded through a core tube and die mounted in an extruder head. Since the openings of the core tube and die are extremely small, a guide tube is required for guiding the leading end of the wire into the openings of the core tube and die. Such a tube is positioned behind the core tube and extends outwardly from the extruder head to facilitate the threading of the wire through the guide tube, core tube and die. Since the guide tube has the wire passing therethrough, the guide tube must remain within the extruder head during the entire extruding operation. Various particles of dirt and metal, which are on the wire, are carried with the wire toward the core tube. When operating without the guide tube, the accumulation of particles about the wire as the wire enters the core tube opening usually is not objectionable. However, with the presence of the guide tube, which is necessitated by the threading operation, an accumulation of particles at the entry side of the core tube results, whereby jamming of the wire occurs resulting in stretching and breaking of the wire. In addition, the passing of the wire through the guide tube during subsequent extruding operations results in considerable wear within the guide tube, thereby necessitating frequent replacement of the guide tube. Hence, the problems presented in the utilization of such a guide tube could be overcome if the tube could be removed immediately after the threading operation and prior to the extruding operation.

It is, therefore, an object of this invention to provide a removable guide tube for the threading of a strand through apparatus.

With this and other objects in view, the present invention contemplates a removable guide tube for facilitating the threading of a strand through an apertured apparatus, and thereafter facilitating the removal of the guide tube so that undesirable particles appearing on the wire as it passes into the core tube are prevented from entering the core tube and are further worked freely away from the entry and the core tube. Further, the removability of the core tube prevents the possibility of wear on the guide portions of the tube.

Other objects and advantages of the invention will be more readily understood from the following detailed description of the guide tube forming a specific embodiment thereof, when read in conjunction with appended drawings in which.

Figure 1:
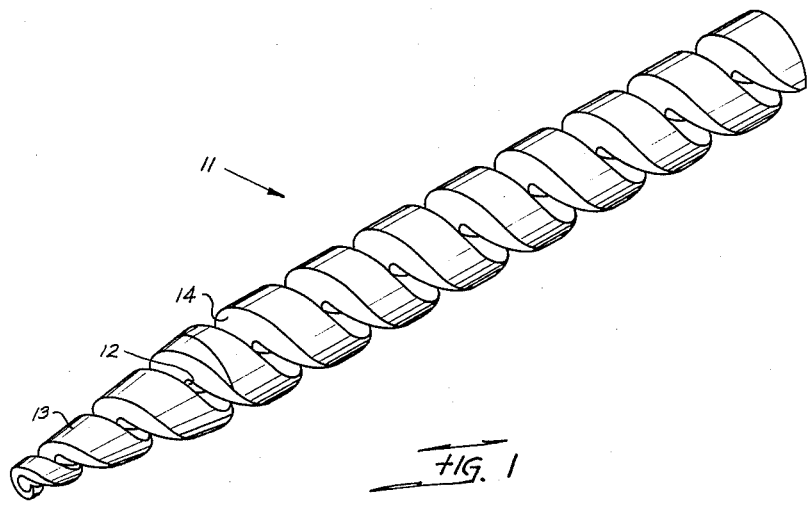
FIG. 1 is a perspective view of a guide tube in accordance with the principles of the invention.
Figure 2:
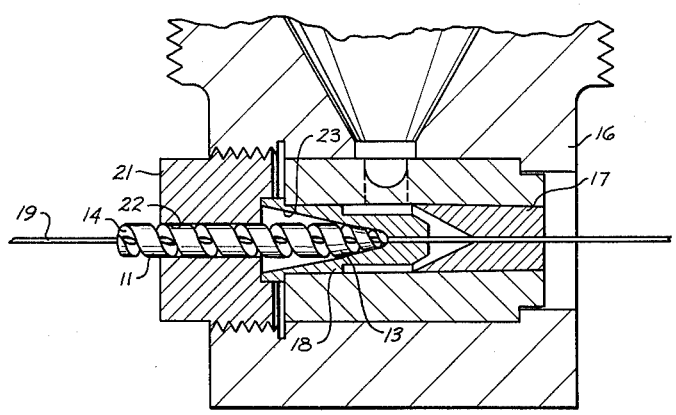
FIG. 2 is a sectional view of an extruder head showing the relative alignment of the guide tube and a core tube and die for the threading of a wire therethrough.

Referring to FIG. 1, a guide tube 11 is formed with a central passage 12 and a tapered end 13. A helical slot 14 is formed in the outer periphery of the guide tube 11 and extends from the tapered end 13 rearwardly to the opposite end. It is noted that the helical slot 14 is contiguous with the passage 12 of the guide tube 11. As shown in FIG. 2, an extruder head 16 is provided with a die 17 and a core tube 18 positioned in alignment for the reception of a wire 19 extending through central openings in the die and core tube. A nut 21 is threadedly fastened to the extruder head 16 to clamp the core tube 18 in the position as shown. The nut 21 is formed with a central opening 22 for receiving the guide 11 therein wherein the tapered end 13 of the guide tube fits snugly within a tapered opening 23 of the core tube 18.

Figure 3:
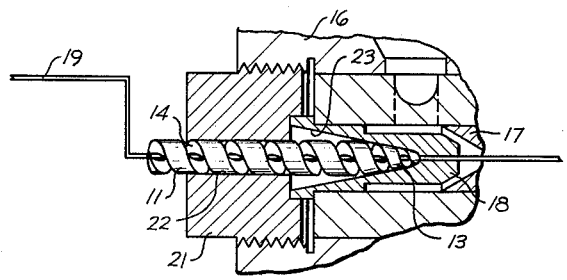
FIGS. 3 through 5 are diagrammatical views showing the sequential manner in which the guide tube is utilized.
Figure 4:
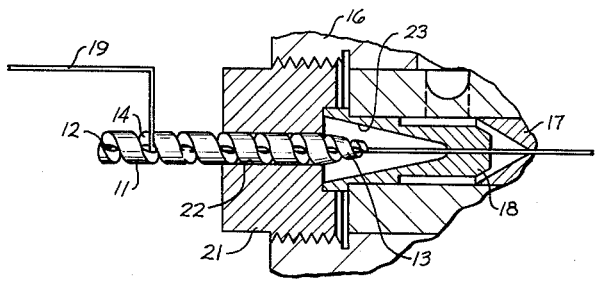
Figure 5:
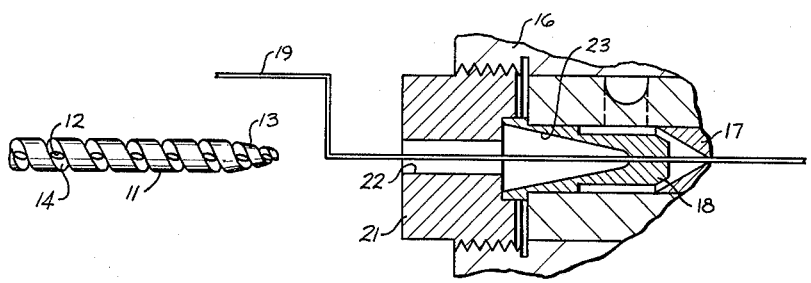

Referring to FIGS. 2 through 5, subsequent to the positioning of the guide tube 11 into engagement with the tapered opening 23 of the core tube 18, the wire 19 is passed through the central passage 12 of the guide tube and is thereby aligned with the openings of the die 17 of the core tube 18. Thereafter, the wire 19 is further urged through the central passage 12 of the guide tube 11 and through the openings of the die 17 and the core tube 18. As shown in FIG. 3, two portions of the trailing end of the wire 19 are each bent at right angles. Thereafter, the guide 11 is withdrawn axially along the trailing portion of the wire 19 until the rear portion of the slot 14 engages a section of wire extending between the right angle bends. The guide tube 11 is then rotated so that the portion of the wire 19 extending between the right angle bends is guided through the helical slots 14 relatively toward the tapered end 13 as viewed in FIG. 4. Subsequently, as shown in FIG. 5, the wire 19 passes completely through the helical slot 14 and the guide tube 11 is thereby removed from the wire. Thereafter, the wire 19 is straightened and the threading operation is completed. Thus, it is seen that undesirable particles, which are carried by the wire 19 into the tapered opening 23 of the core tube 18, are permitted to be worked rearwardly through the tapered opening as they are urged from the wire when the wire passes into the relatively small opening of the core tube. In this manner, there is no clogging apparent at the entry point of the wire 19 relative to the core tube 18, therefore, stretching and breaking of the wire previously apparent due to such clogging is now prevented. In addition, the removal of the guide tube 11 eliminates the necessity of leaving the guide tube in the extruder head 16 during the extrusion process. In this manner, the wear normally experienced by the central passage 12 of the guide tube 11 is prevented, thereby eliminating the necessity of frequently replacing the guide tube.

It is to be understood that the above-described arrangement is simply illustrative of the principles of the invention. Other arrangements may be devised by those skilled in the art which will embody the principles of the invention and fall within the spirit and scope thereof.

What is claimed is:

In an extruder for extruding material about a moving strand, the combination of:

an extruder head having a central opening with strand entrance and exit ends, a die positioned within the central opening at the exit end, the die formed with a passageway for receiving the strand therethrough, a core tube positioned within the central opening of the extruder head between the entrance and exit ends and with its passageway in alignment with the passageway of the die, a guide tube positioned within the opening at the entrance end of the extruder head so that the core tube is positioned between the die and the guide tube, and the tube formed with a helical slot in the periphery thereof contiguous with the passageway for engaging an upturned portion of strand extending therethrough subsequent to the threading of the wire through the core tube and die passageways, whereby the tube may be rotated away from the core tube and the extruder head so that the upturned portion of the strand is guided through the slot and the tube is subsequently removed from engagement with the strand.

References Cited by the Examiner
UNITED STATES PATENTS

| | | | |
|---|---|---|---|
| 1,763,136 | 6/1930 | Crowley et al. | 18—13 |
| 2,488,576 | 11/1949 | Berggren. | |
| 2,805,179 | 9/1957 | Burr | 18—13 |
| 2,805,180 | 9/1957 | Burr | 18—13 |
| 3,111,712 | 11/1963 | Frate. | |

J. SPENCER OVERHOLSER, *Primary Examiner.*

MICHAEL V. BRINDISI, *Examiner.*